(12) United States Patent
Despesse et al.

(10) Patent No.: US 11,437,901 B2
(45) Date of Patent: Sep. 6, 2022

(54) ELECTROMAGNETIC ENERGY CONVERTER

(71) Applicant: COMMISSARIAT A L'ENERGIE ATOMIQUE ET AUX ENERGIES ALTERNATIVES, Paris (FR)

(72) Inventors: Ghislain Despesse, Voreppe (FR); Sebastien Boisseau, Echirolles (FR); Matthieu Boucaud, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 118 days.

(21) Appl. No.: 16/650,540

(22) PCT Filed: Sep. 26, 2018

(86) PCT No.: PCT/FR2018/052374
§ 371 (c)(1),
(2) Date: Mar. 25, 2020

(87) PCT Pub. No.: WO2019/063941
PCT Pub. Date: Apr. 4, 2019

(65) Prior Publication Data
US 2020/0280251 A1 Sep. 3, 2020

(30) Foreign Application Priority Data

Sep. 28, 2017 (FR) ...................................... 1759028

(51) Int. Cl.
*H02K 35/02* (2006.01)
(52) U.S. Cl.
CPC ................................... *H02K 35/02* (2013.01)

(58) Field of Classification Search
CPC .. H01F 7/122; H01F 7/14; H01H 3/28; H01H 50/16; H02K 35/02
See application file for complete search history.

(56) References Cited

U.S. PATENT DOCUMENTS 3,928,988 A * 12/1975 Luth ..................... D04B 15/58
66/138
9,240,267 B2 1/2016 Nagahara et al.
(Continued)

FOREIGN PATENT DOCUMENTS

| CN | 206180812 U | 5/2017 |
| EP | 2 079 154 A2 | 7/2009 |
| EP | 2 264 875 A1 | 12/2010 |

OTHER PUBLICATIONS

International Search Report dated Jan. 25, 2019 in PCT/FR2018/052374 filed on Sep. 26, 2018, 2 pages
(Continued)

*Primary Examiner* — Bernard Rojas
(74) *Attorney, Agent, or Firm* — Oblon, McClelland, Maier & Neustadt, L.L.P.

(57) ABSTRACT

An electromagnetic energy converter including two plates each having an inner face; a flux variation device arranged between the inner faces, and which includes a first prismatic part, a magnet and a second prismatic part, and is arranged to pivot about an axis between two equilibrium positions, and for which the first and second prismatic parts each come into contact with an inner face; and a coil designed to be crossed by a magnetic flux generated by the magnet and guided by the two plates in a first direction when the device is in one equilibrium position, and in a second direction when said device is in the other equilibrium position.

20 Claims, 8 Drawing Sheets

(56) References Cited

U.S. PATENT DOCUMENTS

| | | | |
|---|---|---|---|
| 9,509,304 B2 | 11/2016 | Ruff | |
| 2006/0091984 A1 | 5/2006 | Schmidt | |
| 2008/0315595 A1* | 12/2008 | Bataille | H02K 35/02 |
| | | | 290/1 R |
| 2010/0194213 A1 | 8/2010 | Schmidt | |
| 2011/0133975 A1* | 6/2011 | Cartier Millon | H02K 7/1853 |
| | | | 341/176 |
| 2011/0285487 A1 | 11/2011 | Schmidt | |
| 2012/0293288 A1 | 11/2012 | Schmidt | |

OTHER PUBLICATIONS

French Preliminary Search Report dated Jun. 7, 2018 in French Application 1759028 filed on Sep. 28, 2017, 1 page.

\* cited by examiner

ELECTROMAGNETIC ENERGY CONVERTER

TECHNICAL FIELD

The present invention relates to an electromagnetic energy converter. In particular, the present invention relates to an electromagnetic converter for being implemented in an autonomous switch.

PRIOR ART

An electromagnetic energy converter, known in the state of the art, comprises:
- a ferromagnetic yoke;
- a conducting coil formed by winding a conducting wire around a section of the ferromagnetic yoke,
- a main magnet, offset from the coil, forming a closed magnetic circuit with the yoke.

According to this configuration, a magnetic flux generated by the main magnet and guided by the ferromagnetic yoke passes through the conducting coil.

The general operating principle of the electromagnetic energy converter is based on activating a time variation in the magnetic flux passing through the conducting coil so as to create a voltage across the latter.

In this respect, the electromagnetic energy converter is also provided with a mechanical activation system the action of which enables the time variation in magnetic flux to be activated. In particular, the time variation in magnetic flux can be due to a movement of the main magnet or magnetic circuit supporting the conducting coil, such as described in documents [1] (U.S. Pat. No. 9,240,267) and [2] (U.S. Pat. No. 9,509,304).

However, these electromagnetic energy converters described in documents [1] and [2] are not fully satisfactory.

The moving element (namely the main magnet or magnetic circuit supporting the conducting coil) is generally a mass element, which induces a significant inertia moment, limiting the switching rate and consequently the power and converted energy.

The thickness of the device is generally high, and makes it difficult to integrate the system into a switch.

Furthermore, an energy discharge and/or storage module, such as spring leaves, or pawls, allowing quick motion of the conducting coil or main magnet is generally implemented so that a significant voltage can be achieved across the conducting coil.

By way of example, a movement of a duration in the order of one millisecond is necessary for a converter, having a volume in the order of 1 cm$^3$, to generate a voltage in the order of one Volt across the conducting coil. A voltage in this order of magnitude is especially required as soon as the electromagnetic energy converter is implemented in autonomous switches.

However, the energy discharge and/or storage module is generally in contact with the magnetic circuit thus generating reliability and wear problems.

One purpose of the present invention is therefore to provide a compact electromagnetic energy converter, likely to have a significant voltage across the conducting coil.

Another purpose of the present invention is also to provide an electromagnetic energy converter which is simpler to implement.

DISCLOSURE OF THE INVENTION

The above stated purposes are at least partly achieved by an electromagnetic energy converter comprising:

two ferromagnetic plates each having an inner face;
at least one single-piece magnetic flux variation device disposed between the inner faces, and which comprises, along an elongation axis AA' and in this order, a first prismatic ferromagnetic part, a magnet and a second prismatic ferromagnetic part, said device is arranged to pivot around a pivot axis XX' between two balance positions, and for which the first and second prismatic ferromagnetic parts each come into contact, with a different inner face as soon as the magnetic flux variation device lies in either of both balance positions, and
a conducting coil arranged such that a magnetic flux generated by the magnet and guided by both ferromagnetic plates in a first direction S1 passes therethrough as soon as the magnetic flux variation device lies in one of both balance positions, and in a second direction S2, opposite the first direction S1, as soon as said device lies in the other of both balance positions.

According to one implementation, the magnet has poles in alignment with the elongation axis AA'.

According to one implementation, the contact zones on one and/or the other of both inner faces are distant by a distance D, the distance D being adjusted so that, as soon as an inner face is in contact with one or the other of the first and second prismatic ferromagnetic parts along a contact zone, the magnetic flux generated by the magnet is lower than 20% of the magnetic flux passing through the conducting coil, advantageously zero, at the other contact zone, advantageously the distance D is equal to at least 25% of the inner face size considered along a perpendicular direction to the pivot axis XX'.

According to one implementation, the first and second prismatic ferromagnetic parts each comprises two contact faces for coming into contact, respectively, with one or the other of both inner faces as soon as the magnetic flux variation device lies in one or the other of both balance positions.

According to one implementation, the contact faces of each of the first and second prismatic ferromagnetic parts are planar, and arranged so that the contact between a contact face and an inner face is planar.

According to one implementation, the contact faces of each of the first and second prismatic ferromagnetic parts have a curvature, said curvature being adapted so that the contact between a contact face and an inner face is linear and advantageously tilted with respect to the pivot axis XX'.

According to one implementation, both ferromagnetic plates are held to each other by a ferromagnetic bond around which the winding of the coil is formed.

According to one implementation, the ferromagnetic bond is disposed so that the conducting coil is contained into a volume delimited by both inner faces.

According to one implementation, the ferromagnetic bond comprises two ends at which each of the ferromagnetic plates is fastened.

According to one implementation, the ferromagnetic bond has a cylindrical shape, or a hollow cylindrical shape or a spring pin or coiled spring pin shape.

According to one implementation, the conducting coil is offset from the volume defined by both inner faces.

According to one implementation, said converter further comprises a support to which the magnetic flux variation device is connected through a pivot connection around the pivot axis XX'.

According to one implementation, the pivot connection is provided by a pivot member.

According to one implementation, the pivot member comprises a holding section, said holding section holding the magnet through a fixed connection.

According to one implementation, the pivot member comprises a fork formed by two side branches for holding the magnetic flux variation device at the first prismatic ferromagnetic part, and the second prismatic ferromagnetic part respectively.

According to one implementation, either or both ferromagnetic plates have a recess at right angles with the magnet.

The invention also relates to a switch comprising a converter according to the present invention.

BRIEF DESCRIPTION OF THE DRAWINGS

Further characteristics and advantages will appear in the description that follows of the electromagnetic energy converter according to the invention, given by way of non-limiting examples, with reference to the appended drawings in which:

FIG. 4a represents a spring pin and FIG. 4b represents a coiled spring pin, FIG. 7a is a representation, along a section plane perpendicular to the axis XX', of the converter according to the present invention, in particular, FIG. 7a represents bores of the first and second prismatic ferromagnetic parts for cooperating with both side branches of the pivot member, FIG. 7b is a representation, along a section plane perpendicular to the axis XX', of the converter according to the present invention, in particular, FIG. 7b represents the first concavity and the second concavity of the first and second prismatic ferromagnetic parts for cooperating with both side branches of the pivot member, FIGS. 11a to 11c are schematic representations according to a fourth embodiment of the present invention, in particular, FIG. 11a represents ferromagnetic sheet before folding.

DETAILED DISCLOSURE OF PARTICULAR EMBODIMENTS

The invention described in a detailed way below implements an electromagnetic energy converter equipped with a single-piece magnetic flux variation device disposed between the inner faces of two ferromagnetic plates called a first and a second plate respectively. In this respect, the magnetic flux variation device comprises, along its elongation axis AA' in the following order, a first prismatic ferromagnetic part, a magnet and a second prismatic ferromagnetic part. The magnetic flux variation device is furthermore arranged to pivot around a pivot axis XX' between two balance positions called a first and a second position respectively. In particular, the first and second prismatic ferromagnetic parts each come into contact with a different inner face as soon as the magnetic flux variation device lies in either of both balance positions.

According to the present invention, the magnetic flux variation device switching from one balance position to the other enables a reversal of the magnetic flux generated by the magnet and guided by the ferromagnetic plates in a conducting coil.

In the following text, when an element of the present invention is referred to as being "ferromagnetic" (for example a ferromagnetic part or plate), it is meant that this element comprises a ferromagnetic material.

In this respect, a ferromagnetic material can comprise at least one of the following elements chosen from: an iron based alloy with a high saturation induction such as pure iron, Si-alloyed iron (FeSi), Ni-alloyed iron (FeNi), and Co-alloyed iron (FeCo).

These alloys can also contain alloying elements such as Cr, P, Cu, and Al.

The ferromagnetic material can also comprise a spinel-structure ferrite (MnZn, NiZn). These, due to their low conductivity, are particularly advantageous since they enable eddy current losses to be decreased.

Finally, the ferromagnetic material can also comprise at least one of the elements chosen from: an Fe-based alloy of the metallic glass type prepared in an amorphous or nanocrystalline form.

In FIGS. 1a to 9, an electromagnetic energy converter 100 can be seen.

Figure 2:
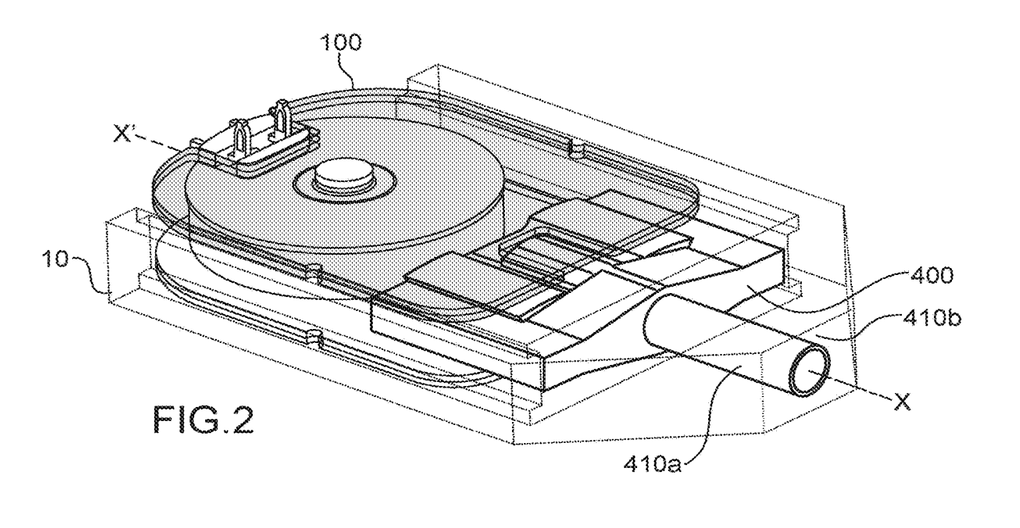
FIG. 2 is a schematic perspective representation of an electromagnetic energy converter held into a support according to the present invention.

The electromagnetic energy converter 100 comprises a support 10 (FIG. 2).

Moreover, it is understood that, throughout the description, when an element or axis of the converter 100 is considered as being fixed, it is held to the support 10 through a fixed connection (or fitting). In other words, mentioning the support 10 could be omitted when an element or axis of the converter 100 is considered as being fixed.

The electromagnetic energy converter 100 also comprises two ferromagnetic plates called a first plate 110 and a second plate 120 (FIGS. 1, 3, 5a, 5b) respectively.

By "plate", it is meant an element comprising two essentially parallel faces connected by a perimeter. The distance between both faces along a direction orthogonal to one of both faces corresponds to the thickness of said plate.

The ferromagnetic plates 110 and 120 can have a thickness between 300 µm and 2 mm, advantageously lower than 1 mm and can consist of a stack of sheets.

The first and second plates 110 and 120 each comprises an inner face called a first face 111 and a second face 121 (FIG. 1a, 1c) respectively.

The electromagnetic energy converter 100 also comprises at least one magnetic flux variation device 200 (FIGS. 1, 2, 5a, 5b). The magnetic flux variation device 200 is disposed between both inner faces 111 and 121.

In other words, the magnetic flux variation device 200 is disposed in the volume defined by both inner faces 111 and 121. It is also intended that disposing the magnetic flux variation device 200 between both inner faces 111 and 121 necessarily implies that both faces face each other. The inner faces 111 and 121 can be for example essentially parallel, advantageously parallel.

Figure 5A:
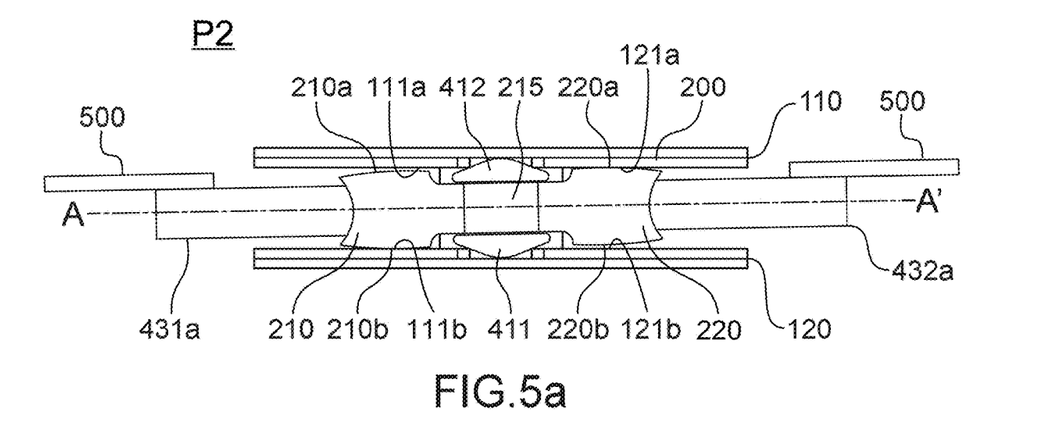
FIGS. 5a and 5b are schematic representations, along a section plane perpendicular to the axis XX', of the converter according to the present invention, in particular, FIGS. 5a and 5b respectively represent a curved contact and a planar contact between a contact face and an inner face.
Figure 5B:
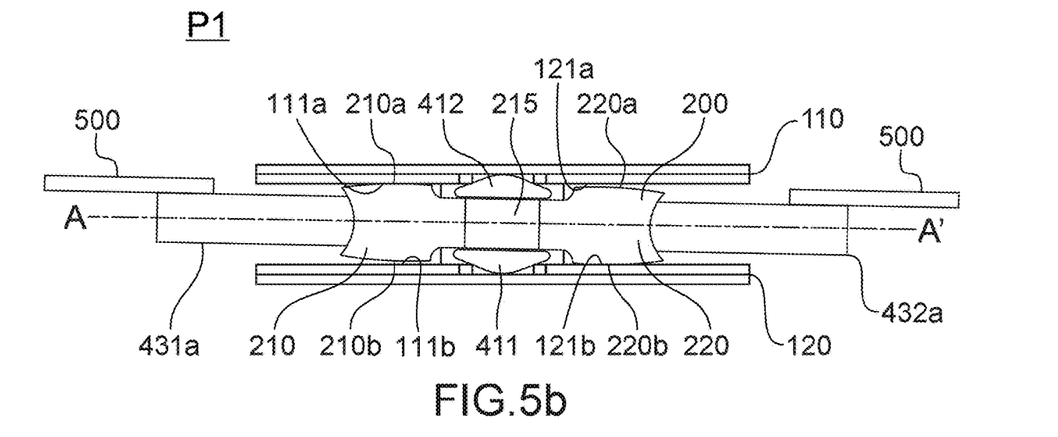

The magnetic flux variation device 200 is as a single piece and extends along an elongation axis AA' (FIGS. 5a and 5b).

The magnetic flux variation device 200 in particular comprises, along its elongation axis AA' in the following order, a first prismatic ferromagnetic part 210, a magnet 215 and a second prismatic ferromagnetic part 220. It is intended that by "magnet", it is meant a permanent magnet.

By "prismatic ferromagnetic part", it is meant a part having a prismatic shape. However, for the purposes of the invention, a prismatic shape can comprise at least one curved face according to conditions which will be set forth later.

The magnet 215 can advantageously have a parallelepipedal shape.

The magnet 215 can comprise at least one of the elements chosen from: NdFeB magnets, SmCo magnets, and ferrite magnets.

The magnet 215 can have poles in alignment with the elongation axis AA'.

The first 210 and second 220 prismatic ferromagnetic parts are for example disposed one on the south pole and the other on the north pole of the magnet 215. The assembly of either or both first and second prismatic ferromagnetic parts with the magnet 215 can be achieved by bonding. This assembly can also be mechanical, for example via a slot formed at either or both ferromagnetic parts and into which the magnet 215 is inserted.

The assembly can also be integrally held by a non-ferromagnetic element, for example by the pivot member described later.

The first 210 and second 220 prismatic ferromagnetic parts each comprise two contact faces. In particular, the first prismatic ferromagnetic part 210 comprises two contact faces called a first upper face 210a and a first lower face 210b (FIGS. 5a and 5b) respectively. Similarly, the second prismatic ferromagnetic part 220 comprises two contact faces called a second upper face 220a and a second lower face 220b (FIGS. 5a and 5b) respectively.

The magnetic flux variation device 200 is also arranged to pivot around a pivot axis XX' between two balance positions called a first position P1 and a second position P2 respectively. The pivot axis XX' can be for example, in any points, equidistant from both inner faces. In other words, the pivot axis XX' extends along a direction from a median plane to both inner faces. The pivot axis XX' can also be perpendicular to the elongation axis AA'.

The magnetic flux variation device 200 switching from its second position P2 to its first position P1 is called a "direct cycle".

Reversely, the magnetic flux variation device 200 switching from its first position P1 to its second position P2 is called an "indirect cycle".

In particular, both balance positions P1 and P2 are positions for which the first 210 and second 220 prismatic ferromagnetic parts each come into contact, through one of their contact faces 210a, 210b, 220a and 220b, with a different inner face 111, 121 (FIGS. 5a and 5b). The contact between an inner face 111, 121, and a contact face 210a, 210b, 220a and 220b is made along a contact zone 111a, 111b, 121a and 121b of the inner face in question. It is then intended that each inner face 111, 121 has two contact zones 111a, 111b, 121a and 121b. For each inner face 111, 121, both contact zones 111a, 111b and contact zones 121a, 121b are at a distance D along a direction perpendicular to the pivot axis XX'.

As soon as the magnetic flux variation device 200 is in a balance position, for example position P1, the first 210 and second 220 prismatic ferromagnetic parts are in contact, respectively, through the first upper face 210a with the first face 111 and through the second lower face 220b with the second face 121.

Reversely, as soon as the magnetic flux variation device 200 is in the other balance position, for example position P2, the first 210 and second 220 prismatic ferromagnetic parts are in contact, respectively, through the first lower face 210b with the second face 121 and through the second upper face 220a with the first face 111.

The contact faces 210a, 210b, 220a and 220b of each of the first 210 and second 220 prismatic ferromagnetic parts can be planar, and arranged so that the contact between a contact face and an inner face is planar (FIG. 5b).

Alternatively, the contact faces 210a, 210b, 220a and 220b of each of the first 210 and second 220 prismatic ferromagnetic parts can have a curvature (convex face), said curvature being adapted so that the contact between a contact face 210a, 210b, 220a and 220b and an inner face 111, 121 is linear along a direction parallel to the pivot axis XX' (FIG. 5a).

For example, the radius of curvature R of the contact face(s) can be at least ten times greater than the length of the prismatic ferromagnetic part in question. By "length of the prismatic ferromagnetic part", it is meant the dimension of said part along the elongation axis AA'.

This contact line can alternatively be tilted with respect to the pivot axis XX'. In other words, the contact line is not parallel to the pivot axis XX'. For example, the contact between the contact line can move away from the axis XX' as the ferromagnetic bond gets closer. This configuration enables, among other things, the magnetic flux to be better distributed at the first 110 and second 120 plates, and thus local saturations to be avoided.

This arrangement is particularly advantageous since it is very simple to implement in comparison with a planar contact. Furthermore, it enables air-cushion effect to be reduced when two planar surfaces are contacted with each other by making air feed or discharge easier in the centre of the surface.

Furthermore, the magnetic flux circulation between the contact face and the inner face is not limited to the linear contact zone, and is therefore actual on either side of said linear contact in a zone where the inner face and the contact face are in proximity to each other, for example by a distance lower than 50 μm.

Upon making contact between a contact face and an inner face, the ferromagnetic plate 110, 120 considered can also deform and locally closely fit said inner face around the linear contact and thus increase the contact zone. In this respect, a ferromagnetic plate having an aspect ratio greater than 10 is particularly advantageous.

Each of both ferromagnetic plates 110 and 120 can have, along its thickness, respectively, a first recess 112 (FIGS. 8*a* and 8*b*) and a second recess 122 (FIG. 8*b*), which can be through or partially through recesses. The first 112 and second 122 recesses are formed at right angles with the magnet 215.

By "at right angles with the magnet", it is meant along a direction perpendicular to the inner faces.

The surface zones covered with the first 112 and second 122 recesses can be each lower than or equal to the surface zone covered with the magnet 215.

Figure 8A:
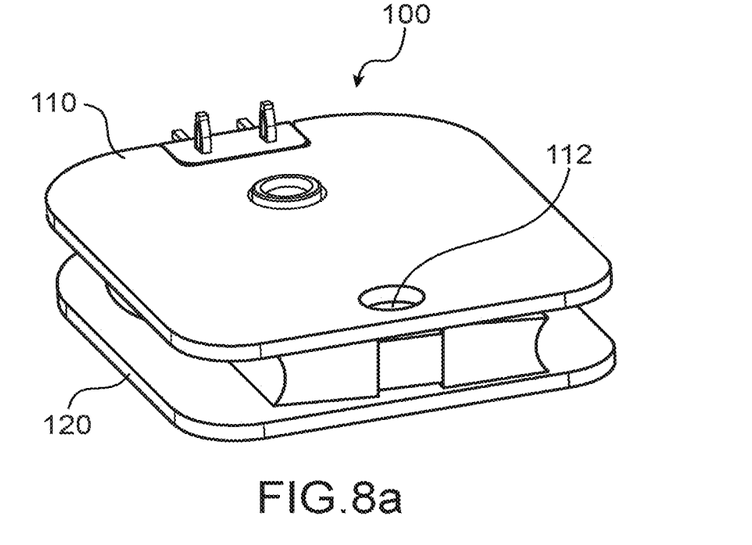
FIG. 8a is a schematic perspective representation of the converter according to the present invention, in particular, the first and second plates are each provided with a circular shaped recess.
Figure 8B:
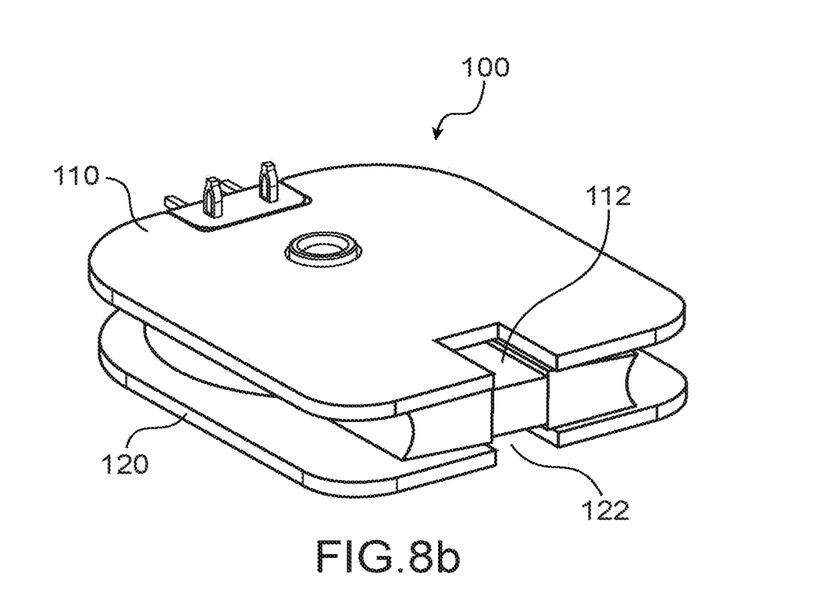
FIG. 8b is a schematic perspective representation of the converter according to the present invention, in particular, the first and second plates are each provided with a slot shaped recess.

The first 112 and second 122 recesses can take the form of a hole (FIG. 8*a*) or a notch (FIG. 8*b*).

The first 112 and second 122 recesses can be through recesses (FIG. 8*a* and FIG. 8*b*) or partial recesses (FIG. 5*a* and FIG. 5*b*).

These first 112 and second 122 recesses are particularly advantageous since they allow mechanical integration of the electromagnetic energy converter 100 to be simplified, especially in the case of the partial recess (FIG. 5*a* and FIG. 5*b*), and also avoid feedback of the magnetic field lines to the magnet 215, improving the energy density and the conversion efficiency of the device.

Figure 1A:
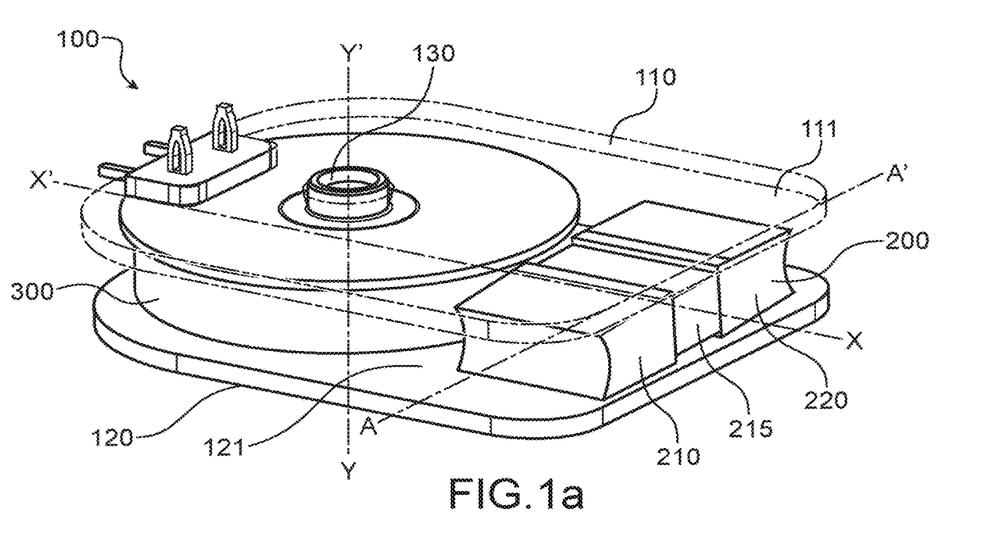
FIG. 1a is a schematic perspective representation of an electromagnetic energy converter according to a first alternative of a first embodiment of the invention, FIG. 1b repeats the characteristics of FIG. 1a, and indicates in mm the dimensions of elements forming the converter according to an exemplary implementation.

The electromagnetic energy converter 100 also comprises a conducting coil 300 (FIG. 1).

For example, the conducting coil 300 extends along an elongation axis YY' and comprises two ends called a first end and a second end respectively.

The conducting coil is made of a winding of a conducting wire, for example a copper wire, along the elongation axis YY' (FIG. 1). Needless to say that is intended that the conducting wire comprises two ends which are, throughout the rest of the present description called terminals of the conducting coil 300.

The conducting coil 300 is arranged such that a magnetic flux generated by the magnet and guided by both ferromagnetic plates 110 and 120, as well as the ferromagnetic bond 130 pass therethrough in a first direction S1 as soon as the magnetic flux variation device 200 lies in one of both balance positions (for example the first position P1), and in a second direction S2, opposite to the first direction S1, as soon as said device 200 lies in the other of both balance positions (for example the second position P2).

Such an electromagnetic energy converter 100 when at rest lies in either of both balance positions. In particular, it can be stabilised in the first balance position P1, so that a magnetic flux passes through the conducting coil along the first direction S1. An external force exerted on the magnetic flux variation device 200 enables said device 200 to be pivoted and causes an indirect cycle. During this rotation (or pivoting), there is a reversal of the magnetic flux passing through the conducting coil 300, and consequently, an occurrence of a voltage across the latter.

Furthermore, the rotation is all the more abrupt that the first P1 and second P2 positions are so-called stable balance positions. In other words, as soon as the magnetic flux variation device lies in either of both balance positions P1 or P2, a return force holds the latter in said position. This effect therefore imparts a bistable character to the electromagnetic energy converter 100. This effect is particularly advantageous when the voltage generated across the conducting coil is all the more significant that this rotation is quick (such as dictated by the Lenz's law). It is thus possible according to this arrangement to generate a significant voltage across the conducting coil 300.

Furthermore, in order to reduce eddy currents, the first 110 and second 120 plates can be laminated or layered, each lamination or layer comprising a ferromagnetic material. By "laminated" or "layered", it is meant a stack of ferromagnetic plates/sheets (FIGS. 5*a* and 5*b*).

Particularly advantageously, the distance D can be adjusted so that, as soon as an inner face 111, 121 is in contact with either of the first 210 and second 220 prismatic ferromagnetic parts along a contact zone 111*a*, 111*b*, 121*a*, 121*b*, the magnetic flux generated by the magnet 215 is lower than 20% of the flux passing through the conducting coil, advantageously zero, at the other contact zone. For example, the distance D can be equal to at least 25% of the inner face size considered along a direction perpendicular to the pivot axis XX'.

Figure 12A:
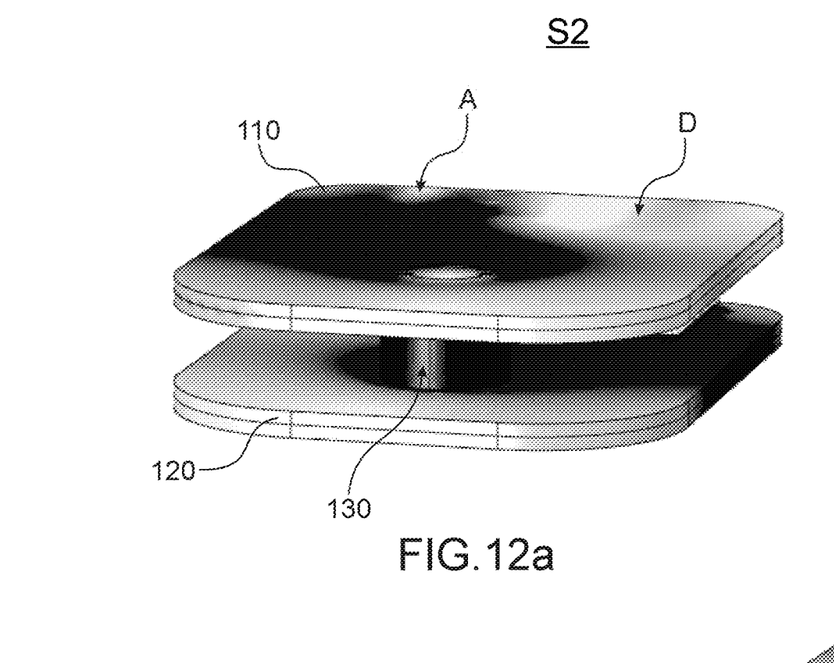
FIGS. 12a and 12b are representations of the magnetic field strength (in grey levels) at the contact zones, when the electromagnetic energy converter is, respectively in the first balance position P1 (FIG. 12a) and in the second balance position P2 (FIG. 12b).
Figure 12B:
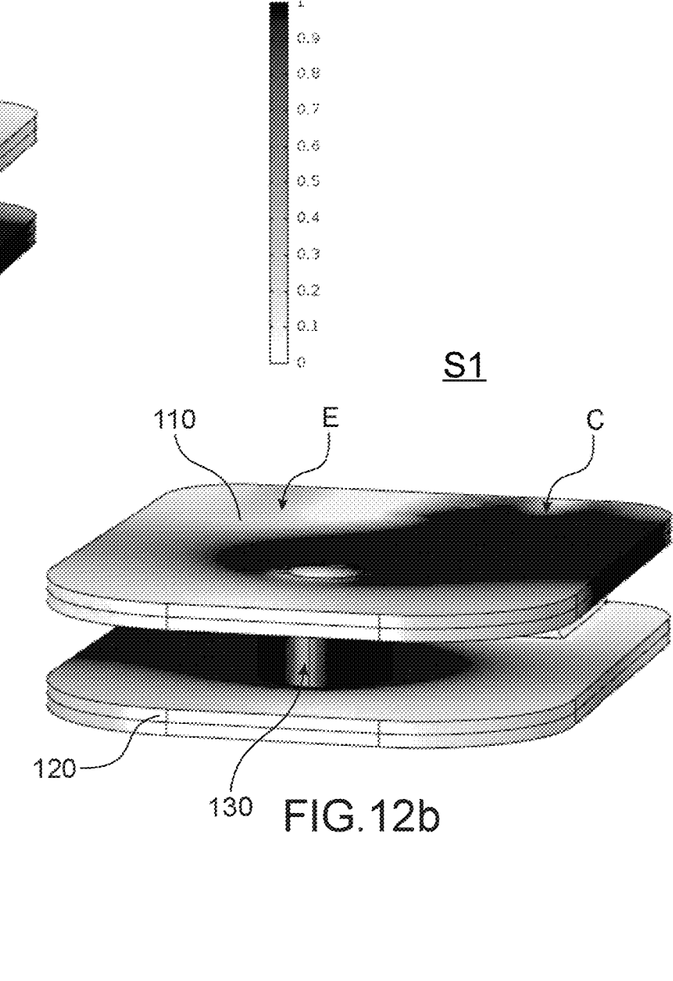

According to this configuration, as represented in FIGS. 12*a* and 12*b*, each contact zone, as soon as the magnetic flux variation device 200 performs either of the direct and indirect cycles, has the magnetic field passing through it switching from a substantially zero value (zone A FIG. 12*a* and zone C FIG. 12*b*) to the value B (zone D FIG. 12*a* and zone E FIG. 12*b*) or reversely. In other words, even if the magnetic field variation passing through the coil is equal to 2B during a direct or indirect cycle, the magnetic field variation at a contact zone during a cycle remains substantially limited to B. This thus enables iron losses to be reduced at the ferromagnetic plates, and consequently, output power and therefore efficiency of the electromagnetic energy converter to be improved.

According to a first advantageous embodiment, both ferromagnetic plates 110 and 120 are held to each other by a ferromagnetic bond 130 around which the winding of the conducting coil 300 is formed.

Figure 1B:
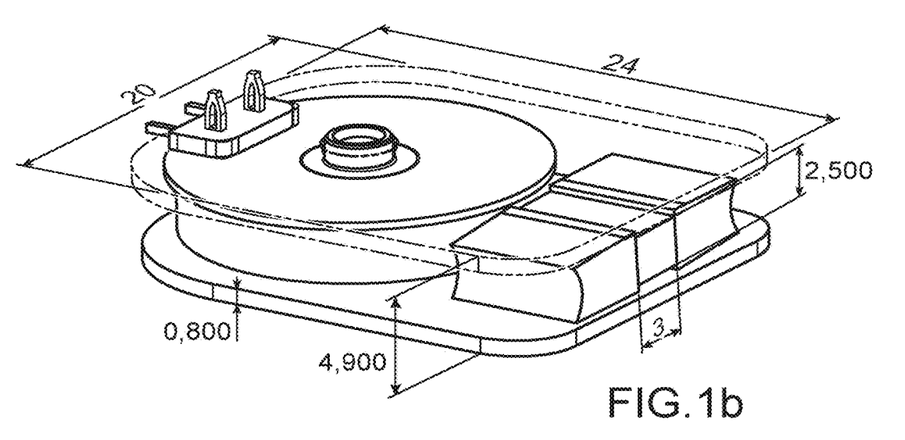
Figure 1C:
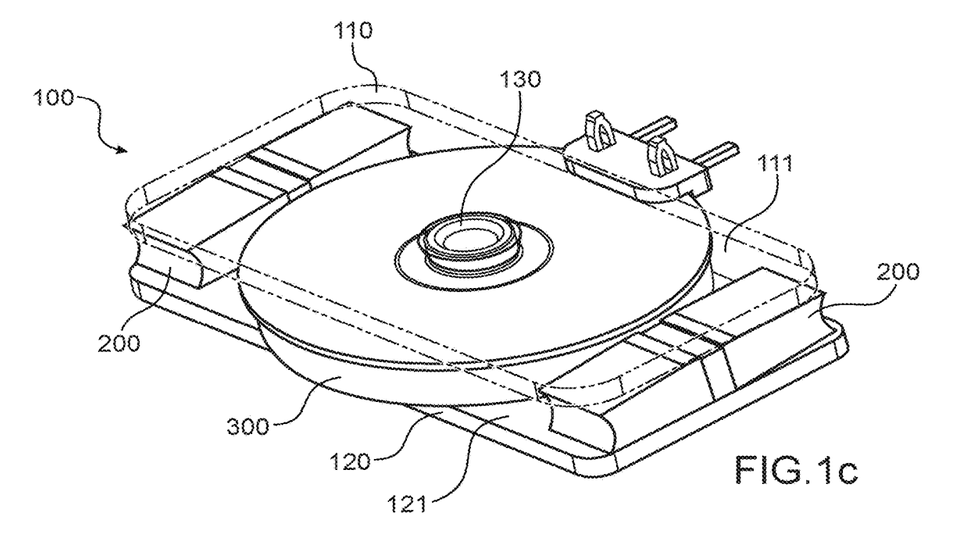
FIG. 1c is a schematic perspective representation of an electromagnetic energy converter comprising two magnetic flux variation devices according to the first alternative of a first embodiment of the invention.

According to a first alternative of this first embodiment, the ferromagnetic bond 130 can be disposed so that the conducting coil 300 is contained in a volume delimited by both inner faces 111 and 121. Particularly, the ferromagnetic bond 130 comprises two ends 131 and 132 at which each of the ferromagnetic plates 110 and 120 are fastened. Holding a ferromagnetic plate at an end of the ferromagnetic bond 130 can be achieved through riveting (FIGS. 1*a* to 1*c*).

Riveting is particularly advantageous since it enables a proper mechanical contact to be ensured between the ferromagnetic bond 130 and the ferromagnetic plate 110, 120, and thus the magnetic flux circulation to be improved (limited iron losses) in the magnetic circuit formed by both ferromagnetic plates 110, 120 and the ferromagnetic bond 130.

The ferromagnetic bond 130 can have a cylinder shape.

Figure 4A:
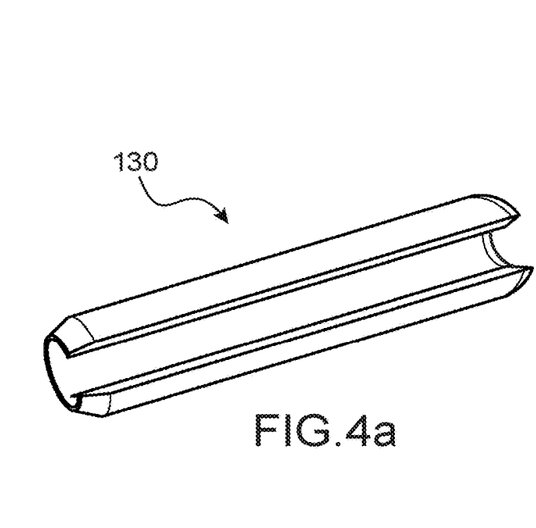
FIGS. 4a and 4b are schematic perspective representations of ferromagnetic bonds likely to be implemented according to the first alternative of the first embodiment of the present invention, in particular.
Figure 4B:
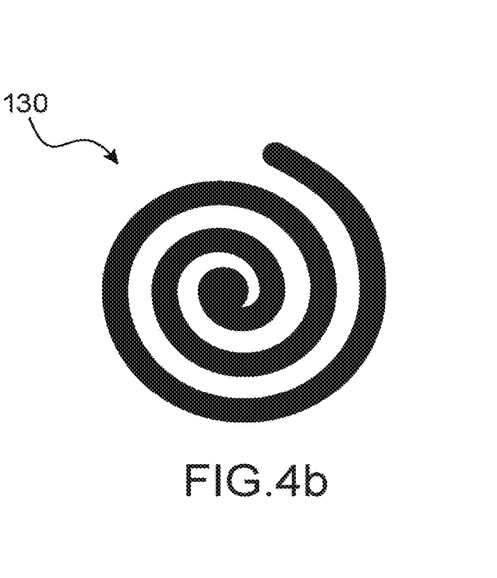

Still in order to limit the iron losses, the ferromagnetic bond 130 can be layered. By way of example, the ferromagnetic bond 130 can be a coiled spring pin (FIG. 4b), or can be laminated with ferromagnetic sheets or layers or can be a spring pin (FIG. 4a).

The connection of this pin type with either of the ferromagnetic plates can be of the friction type into through or partially through holes provided into said plates. This friction type assembly can also be combined with riveting.

Still according to this first alternative, the electromagnetic energy converter 100 can comprise two magnetic flux variation devices 200. Both devices 200 are for example disposed on either side of the coil 300 (FIG. 1c).

According to a second alternative of this first embodiment, the conducting coil 300 is offset from the volume defined by both inner faces 111 and 121.

According to this second alternative, the ferromagnetic bond 130 connecting both ferromagnetic plates 110 and 120 extend laterally to said plates 110 and 120.

Figure 3:
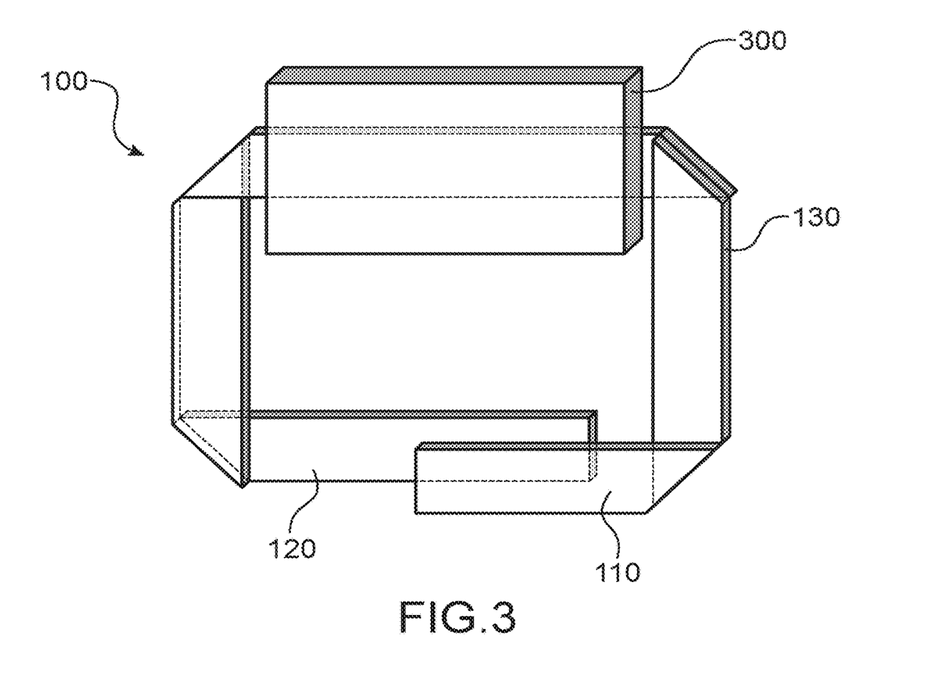
FIG. 3 is a schematic representation in a top view of an electromagnetic energy converter according to a second alternative of the first embodiment of the present invention, the magnetic flux variation device being not represented.

Such an arrangement can be obtained, for example, by folding a ferromagnetic sheet along four folds (FIG. 3). The space separating both ferromagnetic plates is equal to about three times the thickness of the ferromagnetic sheet. A larger space can be obtained with a greater number of folding operations. The use of an oriented ferromagnetic sheet (for example made of an oriented iron-silicon die) enables guiding of the oriented magnetic flux to be achieved according to the orientation of the ferromagnetic material.

Figure 6:
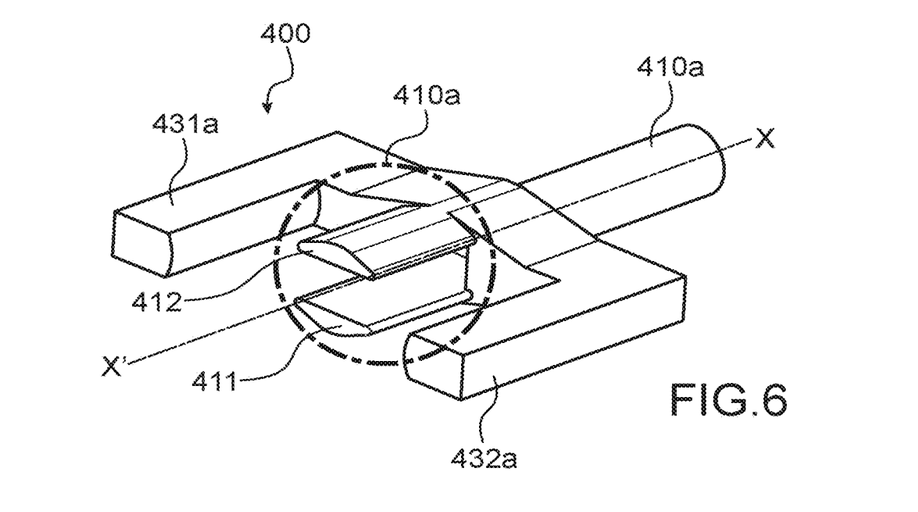
FIG. 6 is a schematic perspective representation of a pivot member likely to be implemented in the electromagnetic energy converter according to the present invention.

Still according to the first embodiment, the magnetic flux variation device can be connected to the support 10 through a pivot connection. The pivot connection is for example provided by a pivot member 400 (FIGS. 2 and 6). The pivot member 400 is for example arranged to, as soon as it is subjected to an external force, dictate a rotational motion around the pivot axis XX' to the magnetic flux variation device 200.

The pivot member 400 can comprise a pivot shaft 410a provided in a pivot bore 410b of the support 10.

The pivot member 400 can comprise a holding section 410 arranged to hold the magnet 215. The holding section 410 can for example comprise two vanes 411 and 412 each respectively bearing against two opposite faces of the magnet 215 (FIGS. 5a, 5b, 6). Advantageously, the holding section 410 can be disposed as an extension of the pivot shaft 410a.

The pivot member 400 can also comprise a fork 430 formed by two side branches 431a and 432a (FIGS. 5a, 5b, 6) holding the magnetic flux variation device 200 at the first 210 and second 220 prismatic ferromagnetic parts.

For example, both side branches 431a and 432a can take the form of introduced shafts of both bores 431b and 432b formed in both prismatic ferromagnetic parts 210 and 220 (FIG. 7a) respectively.

Figure 7A:
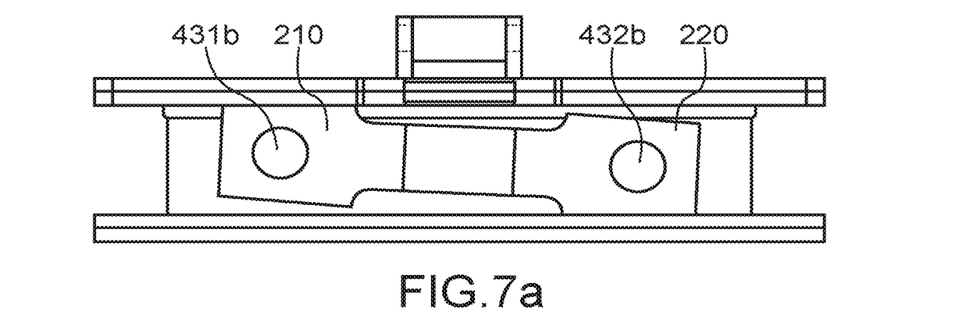
Figure 7B:
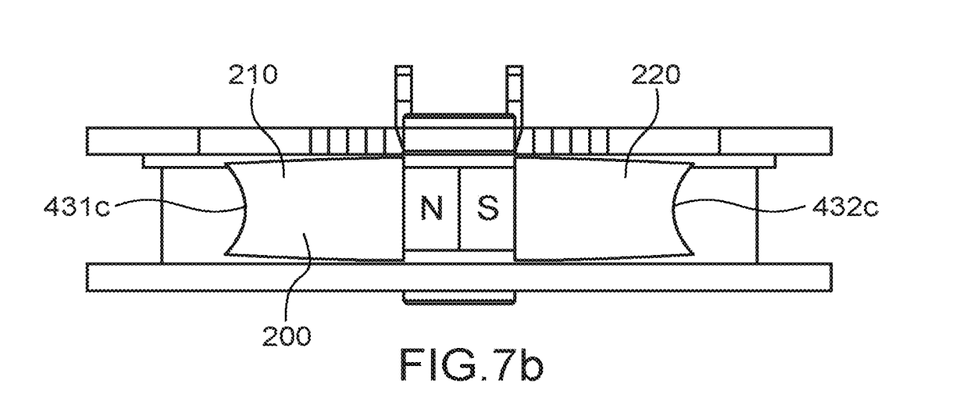

Alternatively, both prismatic ferromagnetic parts 210 and 220 can comprise at their end a complementary shape to that of both side branches 431a and 431b. Both prismatic ferromagnetic parts 210 and 220 can have for example at their end a first concavity 431c and a second concavity 432c, respectively (FIG. 7b).

Still according to this first implementation, the converter 100 can comprise at least one side tab 500 (FIGS. 5a and 5b). The at least one tab is for example disposed on the pivot member. The at least one side tab 500 is arranged to cause the magnetic flux variation device 200 to switch from one balance position to the other, for example from its first balance position P1 to its second balance position P2, when an external force is applied on said tab.

In particular, the at least one side tab 500 can extend along a direction radial to the pivot axis XX'.

Advantageously, the at least one side tab 500 can be adapted to deflect under the action of an external force for causing the magnetic flux variation device 200 to be rotated according to a direct cycle. In particular, the at least one tab 500 can be a spring leaf.

Thus, the at least one side tab 500, when it is subjected to an external force, deflects in a first phase and stores mechanical energy. As soon as the mechanical energy stored by the tab increases to such an extent that the balance position in which the magnetic flux variation device 200 can no longer be kept, the stored mechanical energy is abruptly released and said device 200 pivots around its pivot axis XX' to assume the other balance position.

During this rotation, the tab 500 releases an energy which results in increasing the rotation of the device 200, and consequently an even higher voltage to be achieved across the conducting coil 300.

The inventors have simulated the operation of a converter 100 according to the first alternative of the first embodiment. Dimensions in millimetres of such a converter are illustrated in FIG. 1b.

The magnet 215 is of NdFeB, and has a remanent flux density of 1.4 Tesla. The first 210 and second 220 prismatic ferromagnetic parts are of iron or iron silicon or iron nickel. The conducting coil 300 comprises 600 wire turns having a 100 μm diameter. The magnetic flux variation device can pivot at an angle of +/−3 deg.

According to this arrangement, the recovered energy is 1046 μJ (464 μJ/cm$^3$) and the electromechanical conversion efficiency is 50%.

Figure 9:
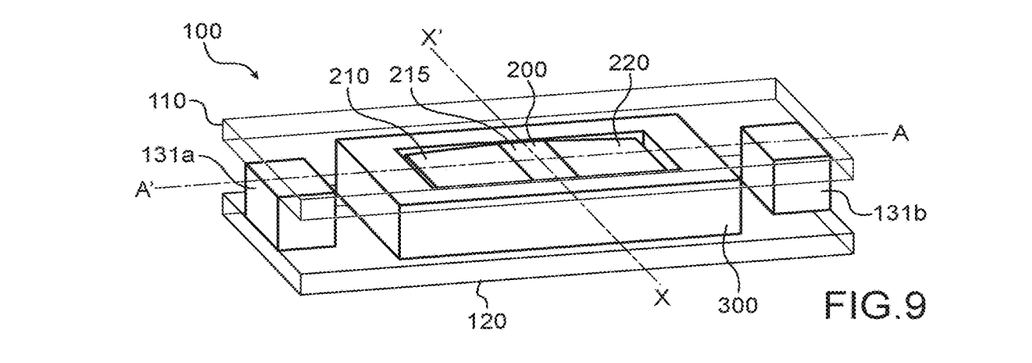
FIG. 9 is a schematic perspective representation of an electromagnetic energy converter according to a second embodiment of the invention.

FIG. 9 represents a second embodiment of the present invention which essentially repeats the characteristics of the first embodiment.

However, unlike the first embodiment, the conducting coil 300 is in this case formed around the magnetic flux variation device 200.

Both ferromagnetic plates 110 and 120 are held to each other by two ferromagnetic bonds 131a and 131b. Each ferromagnetic bond (magnetically) connects, for example, a side of a ferromagnetic plate to a side of the other ferromagnetic plate. A ferromagnetic bond 131a and 131b can for example extend over the whole length of the sides of both plates 110 and 120 interconnected by such bond.

Figure 10:
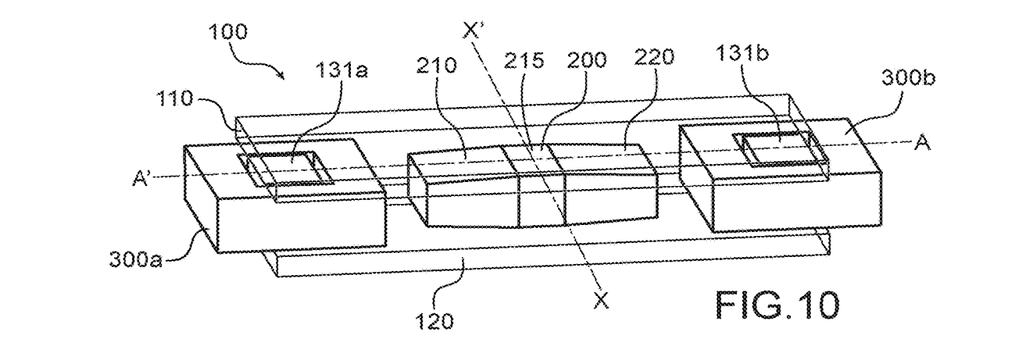
FIG. 10 is a schematic perspective representation of an electromagnetic energy converter according to a third embodiment of the invention.

FIG. 10 represents a third embodiment which differs from the second embodiment in that the electromagnetic energy converter 100 comprises two conducting coils respectively called the first conducting coil 300a and the second conducting coil 300b, each formed around a ferromagnetic bond 131a and 131b.

Figure 11A:
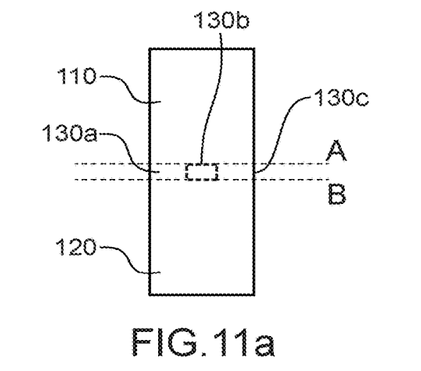
Figure 11B:
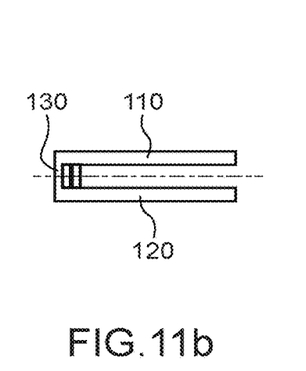
FIGS. 11b and 11c are representations according to side views of the folded sheet along the lines A and B.
Figure 11C:
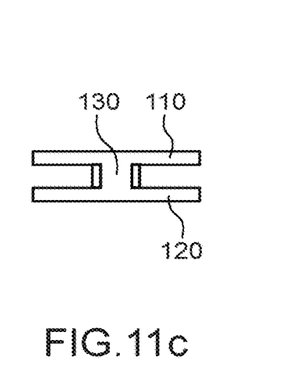

FIGS. 11a to 11c represent a fourth embodiment of the present invention which essentially repeats the characteristics of the first alternative of the first embodiment. However, unlike this first alternative, the ferromagnetic bond 130 holding the ferromagnetic plates together, connect an edge of a ferromagnetic plate to an edge of the other ferromagnetic plate.

According to this fourth embodiment, the ferromagnetic plates 110, 120 and the ferromagnetic bond 130 are obtained by folding a single ferromagnetic sheet. More particularly, the ferromagnetic sheet is subjected to two folding operations, respectively, along a first line A and a second line B parallel to each other. The sheet section disposed between lines A and B, called a centre section, is to form the ferromagnetic bond 130, both other sheet sections, disposed on either side of the centre section, each form a ferromagnetic plate 110, 120.

Both folding operations are then performed so that both ferromagnetic plates 110, 120 are essentially parallel to each other, and advantageously perpendicular to the ferromagnetic bond 130 formed by the centre section.

Both folding operations can be also preceded by partial cutting operations along lines A and B. In particular, the partial cutting operations are to form two ferromagnetic tabs 130a and 130c disposed and held on either side of a bond section 130b connecting both ferromagnetic plates. Advantageously, these ferromagnetic tabs 130a and 130c are bent back onto the bond section 130b to form the ferromagnetic bond.

The present invention also relates to a switch, for example an autonomous switch comprising the electromagnetic energy converter according to the present invention.

Each of the at least one side tab can be associated with a button and/or a particular functionality of the switch.

Implementing an electromagnetic energy converter enables small size and more robust autonomous switches to be made with respect to the switches known in the state of the art.

The electromagnetic energy converter can also be implemented in limit controls and sensors, opening detectors, and other mechanically actuated autonomous detectors.

In most cases, the recovered energy will be partly used to transmit radio information to a remote wireless receiver, which information for example gives state of the switches/sensors/detectors. However, other applications are possible, such as for example for counting events, with a recording into a memory and which does not necessarily communicate at each mechanical pressure.

REFERENCES

[1] U.S. Pat. No. 9,240,267,
[2] U.S. Pat. No. 9,509,304.

The invention claimed is:

1. An electromagnetic energy converter comprising:
two ferromagnetic plates each having an inner face;
at least one single-piece magnetic flux variation device disposed between the inner faces, and which comprises, along an elongation axis in the following order, a first prismatic ferromagnetic part, a magnet and a second prismatic ferromagnetic part, wherein the device is configured to pivot around a pivot axis between two balance positions, and the first and second prismatic ferromagnetic parts each come into contact, according to contact zones on the inner faces, with the inner faces as soon as the magnetic flux variation device lies in either of both balance positions; and
a conducting coil arranged between the inner faces and such that a magnetic flux generated by the magnet and guided by both ferromagnetic plates passes therethrough in a first direction as soon as the magnetic flux variation device lies in one of both balance positions, and in a second direction, opposite to the first direction, as soon as said device lies in the other of both balance positions.

2. The converter according to claim 1, wherein the magnet has poles in alignment with the elongation axis.

3. The converter according to claim 1, wherein the contact zones on either or both inner faces are separated by a distance, the distance being adjusted so that, as soon as an inner face is in contact with either of the first and second prismatic ferromagnetic parts along a contact zone, the magnetic flux generated by the magnet is lower than 20% of the magnetic flux passing through the conducting coil at the other contact zone.

4. The converter according to claim 1 wherein the first and second prismatic ferromagnetic parts each comprise two contact faces for coming into contact, respectively, with either of both inner faces as soon as the magnetic flux variation device lies in one or the other of both balance positions.

5. The converter according to claim 4, wherein the contact faces of each of the first and second prismatic ferromagnetic parts are planar, and arranged so that the contact between a contact face and an inner face is planar.

6. The converter according to claim 4, wherein the contact faces of each of the first and second prismatic ferromagnetic parts have a curvature, said curvature being adapted so that the contact between a contact face and an inner face is linear and tilted with respect to the pivot axis.

7. The converter according to claim 1, wherein both ferromagnetic plates are held to each other by a ferromagnetic bond around which winding of the coil is formed.

8. The converter according to claim 7, wherein the ferromagnetic bond is disposed so that the conducting coil is contained into a volume delimited by both inner faces.

9. The converter according to claim 8, wherein the ferromagnetic bond comprises two ends at which each of the ferromagnetic plates is fastened.

10. The converter according to claim 9, wherein the ferromagnetic bond has a cylindrical shape, or a hollow cylindrical shape or a spring pin or coiled spring pin shape.

11. The convener according to claim 7, wherein the conducting coil is offset from a volume defined by both inner faces.

12. The converter according to claim 1, wherein said converter further comprises a support to which the magnetic flux variation device is connected, through a pivot connection around the pivot axis.

13. The converter according to claim 12, wherein the pivot connection is provided by a pivot member.

14. The converter according to claim 13, wherein the pivot member comprises a holding section, said holding section holding the magnet through a fixed connection.

15. The converter according to claim 13, wherein the pivot member comprises a fork formed by two side branches for holding the magnetic flux variation device at the first prismatic ferromagnetic part and at the second prismatic ferromagnetic part, respectively.

16. The converter according to claim 1, wherein either or both ferromagnetic plates has a through or partial recess at right angles with the magnet.

17. A switch comprising a converter according to claim 1.

18. The converter according to claim 3, wherein the distance is equal to at least 25% of an inner face size considered along a direction perpendicular to the pivot axis.

19. The converter according to claim 3, wherein the magnetic flux generated by the magnet is zero at the other contact zone.

20. The converter according to claim 1, wherein
the two ferromagnetic plates define a space between the inner faces bounded by an outer periphery of the plates; and
the conducting coil is disposed within the space.

* * * * *